US010674710B2

(12) United States Patent
Ren

(10) Patent No.: US 10,674,710 B2
(45) Date of Patent: Jun. 9, 2020

(54) BALL-THROWING SCOOP FOR INTERACTION WITH PET

(71) Applicant: SHENZHEN XINGRISHENG INDUSTRIAL CO., LTD., Shenzhen, Guangdong Province (CN)

(72) Inventor: Dan Ren, Guangdong Province (CN)

(73) Assignee: SHENZHEN XINGRISHENG INDUSTRIAL CO., LTD. (CN)

( * ) Notice: Subject to any disclaimer, the term of this patent is extended or adjusted under 35 U.S.C. 154(b) by 223 days.

(21) Appl. No.: 15/126,582

(22) PCT Filed: May 23, 2014

(86) PCT No.: PCT/CN2014/078334
§ 371 (c)(1),
(2) Date: Sep. 15, 2016

(87) PCT Pub. No.: WO2015/176324
PCT Pub. Date: Nov. 26, 2015

(65) Prior Publication Data
US 2017/0079243 A1 Mar. 23, 2017

(51) Int. Cl.
*A01K 15/02* (2006.01)
*A63B 60/52* (2015.01)
*A63B 59/20* (2015.01)
*A63B 60/16* (2015.01)

(52) U.S. Cl.
CPC ............ *A01K 15/025* (2013.01); *A63B 59/20* (2015.10); *A63B 60/16* (2015.10); *A63B 60/52* (2015.10); *A63B 2208/14* (2013.01); *A63B 2210/50* (2013.01); *A63B 2225/687* (2013.01)

(58) Field of Classification Search
CPC ...... A01K 15/025; A63B 59/20; A63B 60/52; A63B 60/16; A63B 2210/50; A63B 2208/14; A63B 2225/687
USPC .......................................................... 119/707
See application file for complete search history.

(56) References Cited

U.S. PATENT DOCUMENTS

| 1,022,186 | A | * | 4/1912 | Engler | A63B 59/20 |
| | | | | | 473/509 |
| 2,214,437 | A | * | 9/1940 | Punte | B65D 47/263 |
| | | | | | 206/536 |
| 2,510,403 | A | * | 6/1950 | Krupp | A63B 67/083 |
| | | | | | 473/509 |
| D183,084 | S | * | 6/1958 | Carlson | D21/723 |
| 3,115,129 | A | * | 12/1963 | Merriman | A63B 59/20 |
| | | | | | 124/5 |

(Continued)

*Primary Examiner* — Ebony E Evans
(74) *Attorney, Agent, or Firm* — PROI Intellectual Property US

(57) ABSTRACT

The present invention relates to a ball-throwing scoop for interaction with a pet, comprising a scoop body and a handle. The scoop body includes a scoop opening, two sides and a base portion. The scoop body resembles a smaller half of a circular tube or approximately circular tube longitudinally cut off, the longitudinal central axis y of which is an arc having a larger radius R; r is used to denote the radius of the smaller half of the circular tube, R>>r; the base portion of the scoop body is connected to the handle in the shape of a hollow cylinder, the central axis of the handle obliquely intersects the longitudinal central axis of the scoop body, a cavity of the handle can store liquid or solid pet drinks/foods, especially a cylindrical biscuit box.

11 Claims, 5 Drawing Sheets

(56) References Cited

U.S. PATENT DOCUMENTS

| | | | | |
|---|---|---|---|---|
| 3,370,746 A * | 2/1968 | Haas | A63H 5/04 | |
| | | | 124/16 | |
| 3,392,978 A * | 7/1968 | Wiest, Jr. | A63B 67/083 | |
| | | | 473/509 | |
| 3,410,455 A * | 11/1968 | Haas | B65D 83/0418 | |
| | | | 221/229 | |
| 4,171,753 A * | 10/1979 | Vreede | B65D 83/0418 | |
| | | | 206/536 | |
| 4,548,413 A * | 10/1985 | David | A63B 59/00 | |
| | | | 473/173 | |
| 5,174,580 A * | 12/1992 | Pratt | A63B 60/08 | |
| | | | 473/513 | |
| 5,178,298 A * | 1/1993 | Allina | B65D 83/0418 | |
| | | | 206/457 | |
| 5,290,039 A * | 3/1994 | Cornelio | A63B 60/06 | |
| | | | 473/513 | |
| 5,372,267 A * | 12/1994 | Hofmann | B65D 47/283 | |
| | | | 206/536 | |
| 5,465,704 A * | 11/1995 | Kohl | F41B 3/00 | |
| | | | 124/5 | |
| D367,225 S * | 2/1996 | Rothman | D9/730 | |
| 5,579,748 A * | 12/1996 | Kohl | F41B 3/00 | |
| | | | 124/5 | |
| 5,915,560 A * | 6/1999 | George | B65D 83/0445 | |
| | | | 206/535 | |
| D425,593 S * | 5/2000 | Kirch | D21/722 | |
| D428,085 S * | 7/2000 | Kirch | D21/722 | |
| 6,112,703 A * | 9/2000 | Handelsman | A01K 15/026 | |
| | | | 119/707 | |
| 6,537,163 B2 * | 3/2003 | Hicks | A63B 67/083 | |
| | | | 473/509 | |
| 6,564,967 B1 * | 5/2003 | Stringfield | B65D 83/0418 | |
| | | | 221/229 | |
| 6,880,951 B2 * | 4/2005 | Yoon | F21L 4/027 | |
| | | | 362/202 | |
| 7,207,464 B2 * | 4/2007 | Brenner | B65D 83/049 | |
| | | | 221/247 | |
| 7,648,433 B1 * | 1/2010 | Huqueriza | A63B 67/002 | |
| | | | 473/510 | |
| 8,333,288 B2 * | 12/2012 | Miller | B65D 3/04 | |
| | | | 215/211 | |
| 9,764,888 B2 * | 9/2017 | Tiesberger | B65D 85/62 | |
| D818,549 S * | 5/2018 | Su | D21/722 | |
| 10,463,935 B1 * | 11/2019 | Hung | A63B 65/122 | |
| 2005/0183674 A1 * | 8/2005 | Zutis | A01K 5/0114 | |
| | | | 119/719 | |
| 2007/0277746 A1 * | 12/2007 | Piaget | A01K 15/025 | |
| | | | 119/707 | |
| 2010/0242938 A1 * | 9/2010 | FitzGerald | A63B 60/10 | |
| | | | 124/5 | |
| 2012/0012068 A1 * | 1/2012 | Costello | A01K 15/025 | |
| | | | 119/707 | |
| 2013/0233246 A1 * | 9/2013 | Wang | A01K 5/0114 | |
| | | | 119/51.01 | |

\* cited by examiner

BALL-THROWING SCOOP FOR INTERACTION WITH PET

CROSS REFERENCE TO RELATED APPLICATIONS

The present application is the US national stage of International Patent Application PCT/CN2014/078334 filed on May 23, 2014.

TECHNICAL FIELDS

The present invention relates to a pet training or exercising apparatus, and to a toy specifically used for pet interaction, and more particularly, to a ball-throwing scoop for interaction with a pet.

BACKGROUND ART

There are not many simple toys for interaction with a pet in the prior art. Such kind of toys can only perform a single function, instead of multiple functions simultaneously. The scoop in the prior art is a common tool usually used for scooping powdery or lumpy objects, and often comprises a handle and a scoop body, wherein the handle is merely used for holding, instead of storage, and is in most cases longer than the scoop body so as to increase the arm of force for holding the distal end of the handle. The shape of the scoop in the prior art is not suitable for scooping a ball, and the scoop in the prior art has no space for accommodating pet foods/drinks and therefore is not suitable for training or exercising a pet.

The present invention provides a ball-throwing scoop having a handle provided therein with a space for accommodating pet foods/drinks. In comparison with the prior art, the scoop of the present invention is specifically used for throwing and scooping a toy ball for pets, and can easily throw the scooped ball farther. There is no need to pick up the ball by hand, and the ball-scooping and ball-throwing functions can be easily achieved while keeping the hands clean; and the handle is provided therein with a space for accommodating pet foods/drinks so as to timely and conveniently reward pets with foods/drinks when a person is playing games and interacting with a pet using a ball. Especially when the pet gets the ball back, preloaded foods or drinks can be drawn out of the accommodating space for a timely reward and to increase the fun for interaction with pets.

SUMMARY OF THE INVENTION

The present invention provides a ball-throwing scoop for interaction with a pet so as to solve the technical problem of overcoming the shortcomings in the prior art. The technical solutions of the present invention used for solving the technical problem are presented as follows:

a ball-throwing scoop for interaction with a pet, comprising a scoop body and a handle, the scoop body including a scoop opening, two sides and a base portion, wherein the scoop body resembles a smaller half of a circular tube or approximately circular tube longitudinally cut off, the longitudinal central axis of which is denoted by y, the longitudinal central axis y being an arc having a larger radius R; in the cross-section of the smaller half of the circular tube or approximately circular tube, r is used to denote the radius of the smaller half of the circular tube, a Greek letter $\theta$ is used to denote a central angle to which the arc in the cross-section corresponds, $R \gg r$, and $2\pi/3 \le \theta \le \pi$; the base portion of the scoop body is connected to the handle, the central axis z of the handle intersects the longitudinal central axis y of the scoop body at point m, and intersects the normal fm of the longitudinal central axis y at the point m with an angle of $\beta \ge 0$.

The central axis z of the handle intersects the longitudinal central axis y of the scoop body at the point m, and intersects the normal $f_m$ at the point m with an angle of $\beta \le \pi/3$.

A longitudinal equalization line k of a smaller half of an oval plane formed of all the rims of the scoop opening intersects the longitudinal central axis y of the scoop body at point n and intersects the normal fn at the point n with an angle of $\delta$, wherein $0 \le \delta \le \pi/2$.

The length of an arc mn on the longitudinal central axis y of the scoop body can be regarded as the nominal length of the scoop body, and the arc mn has a radius R and a corresponding central angle $\alpha \ge \pi/2$.

The two sides of the scoop body are symmetrically located at both sides of a central plane delimited by the longitudinal central axis y of the scoop body and the central axis z of the handle that intersect each other.

The base portion of the scoop body is like or approximate to a smaller half of a spherical surface, the center of the spherical surface is the point m where the longitudinal central axis y intersects the central axis z of the handle, the radius of the spherical surface is the radius r of the smaller half of the circular tube or approximately circular tube; the longitudinal equalization line P of the plane formed by the rim of the upper edge of the base portion intersects the central axis z of the handle at an angle of $\xi \le \pi/2$.

There are two or more ridges on the inner surface of the scoop body; the ridges are in the shape of triangle, rectangle or semi-circle in the cross-section of the smaller half of the circular tube; when there are only two ridges, they are symmetrically located at both sides of a central plane delimited by the longitudinal central axis y of the scoop body and the central axis z of the handle that intersect each other; and the central angle formed by the two ridges in the cross-section of the scoop body is $\eta \le \theta$.

A chord formed by the two ridges in the cross-section of the scoop body is denoted by q, and the chord q is a plane or partially a plane with respect to the bottom of the scoop body.

The ball-throwing scoop for interaction with a pet is provided, wherein the handle and the scoop body are integrally formed in process, and the handle is in a shape of a hollow cylinder with a cavity therein to store liquid or solid pet drinks/foods The cavity within the hollow cylindrical handle can accommodate a cylindrical biscuit box and a slot for holding the biscuit box in position, the slot including a first slot and a second slot that are asymmetrically positioned in the tail of the handle.

On the outer surface of the biscuit box is there a protruding ring fitting well with the handle, the protruding ring having two asymmetrical lugs; when the biscuit box is axially placed into the handle, the lugs are embedded onto the first slot and the second slot correspondingly to fix the biscuit box within the handle. The biscuit box comprises a fixing pin, a box cover, a spring, a top plate and a box body; the spring is fixed onto the box cover by the fixing pin, the top plate is connected with the front end of the spring so as to be telescopically placed into the box body, the box cover is fixedly connected with the box body through threads; and an outlet for biscuits is arranged at a side of the front section of the box body.

The handle comprises inner supporting ribs, bulging rings and upper and lower hook-like bosses; there are two or more inner supporting ribs; the plurality of inner supporting ribs is symmetrically arranged with respect to the central axis z of the handle and equidistantly distributed on the inner wall of the handle close to the scoop body; there is a plurality of bulging rings that is equidistantly distributed on the outer wall of the handle; and the upper and lower hook-like bosses in the front view are horizontally symmetrically arranged, with respect to the central axis z of the handle, on the outer wall of the handle between the bulging rings and the slot.

A ball-throwing scoop for interaction with a pet further comprises a handle cover that includes a cover ring, slots and a tail cover; the cover ring being sleeved onto the tail of the handle; the tail cover and the cover ring being hingedly connected; the slots being symmetrically arranged on the inner wall of the handle cover, two of the slots rotatably cooperating with the upper and lower hook-like bosses of the handle to secure the handle cover to the handle; the handle cover rotating in a counter-clockwise direction so as to thread hooks of the upper and lower hook-like bosses of the handle into the hook-like slots of the handle cover, the handle cover being fixed to the handle; and the handle cover rotating in a clockwise direction so as to thread hooks of the upper and lower hook-like bosses of the handle out of the hook-like slots of the handle cover, the handle cover being disengaged from the handle. The opening direction of the tail cover is consistent with the direction of the outlet for the biscuits when the handle cover and the biscuit box are fixed to the handle.

Compared with the prior art, the technical solutions of the present invention have the advantageous effects that the arc-shaped scoop body of the ball-throwing scoop is very suitable for scooping a ball; the cambered face of the scoop opening and the inclined scoop body work together to make the ball easily roll into the scoop body when the ball is scooped, rendering the scooping of balls energy-saving; the arc-shaped scoop body enables the ball-throwing arm of force larger than that of the scoop bodies of other shapes, such that the ball, when rolling from the base portion to the scooping opening, has a larger initial velocity of movement and can be thrown farther with ease; the arc-shaped scoop body can accommodate a plurality of balls simultaneously; the curvature and height of the two sides of the arc-shaped scoop body allow it to accommodate balls that accord therewith in size; and prevent the ball falling out from the two sides of the scoop body; the ridges in the arc-shaped scoop body function to guide the moving trajectory of the ball so that the ball guided by the ridges within the scoop body rolls along the arc of the scoop body; and the shape and internal structure of the scoop body is especially suitable for scooping and throwing of a circular object, so the scooping and throwing of balls become easier and more funny.

The handle of the ball-throwing scoop is provided therein with a space for storing pet foods/drinks so as to timely and conveniently reward pets with foods/drinks when a person is playing games and interacting with a pet using a ball.

DETAILED DESCRIPTION OF THE PREFERRED EMBODIMENTS

Figure 1:
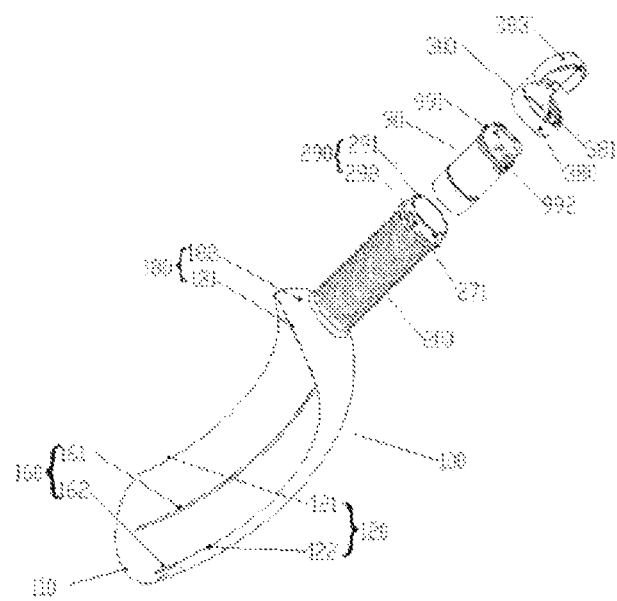
FIG. 1 is an exploded schematic view under axonometric projection of a preferred embodiment of "a ball-throwing scoop for interaction with a pet" according to the present invention.
Figure 2:
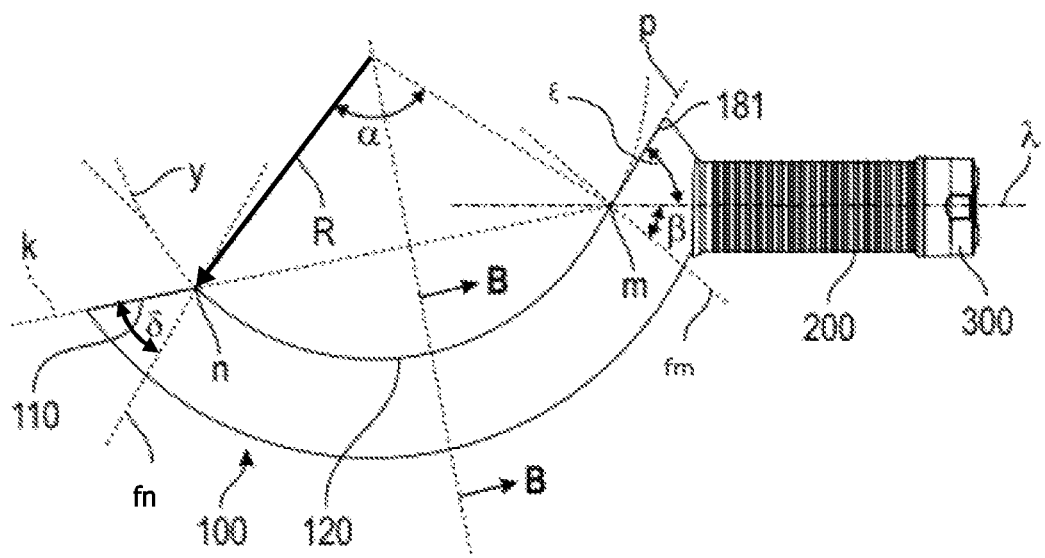
FIG. 2 is a front structural view under orthographic projection of the preferred embodiment with a handle cover (300) assembled in position.
Figure 3:
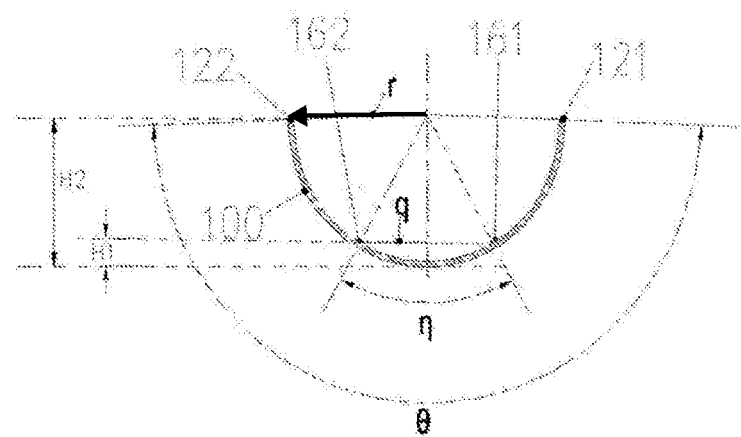
FIG. 3 is an enlarged cross-sectional view taken along the line B-B of FIG. 2.
Figure 4:
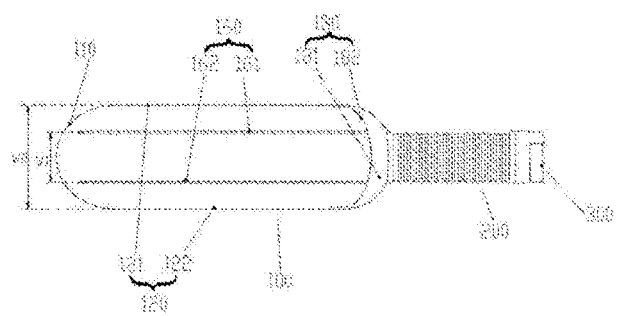
FIG. 4 is a top structural view of the preferred embodiment with the handle cover (300)
Figure 5:
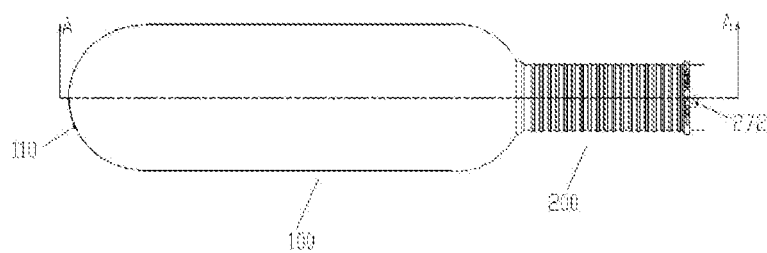
FIG. 5 is a bottom structural view of the preferred embodiment without the handle cover (300)
Figure 6:
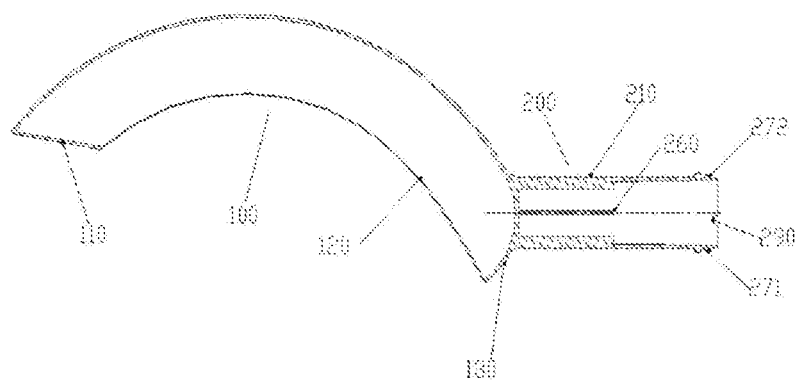
FIG. 6 is a cross-sectional view taken along the line A-A of FIG. 5.

The present invention will be explained in detail with reference to the drawings.

With reference to FIGS. 1 to 10, one of the preferred embodiments of the present invention is a ball-throwing scoop for interaction with a pet, comprising a scoop body 100 and a handle 200, the scoop body 100 includes a scoop opening 110, two sides 120 and a base portion 180, the scoop body 100 resembles a smaller half of a circular tube or approximately circular tube longitudinally cut off, the longitudinal central axis of which is denoted by y, the longitudinal central axis y is an arc having a larger radius R; in the cross-section of the smaller half of the circular tube or approximately circular tube, r is used to denote the radius of the smaller half of the circular tube, a Greek letter θ is used to denote a central angle to which the arc in the cross-section corresponds, R>>r, and $2\pi/3 \leq \theta \leq \pi$; the base portion 180 of the scoop body 100 is connected to the handle 200, the central axis z of the handle 200 intersects the longitudinal central axis y of the scoop body 100 at point m, and intersects the normal fm of the longitudinal central axis y at the point m with an angle of β≥0.

The longitudinal cross-section of the arc-shaped curved surface of the scoop body 100 is in a shape of semi-circle or semi-oval; and the curved surface of the scoop body 100 is arc-shaped or approximately arc-shaped, so that the scoop is especially suitable for scooping a ball. The arc and length of the scoop body 100 can be adjusted according to the situations of balls to be scooped. If the ball to be scooped is round, the best profile of the curved surface is a circular arc; and if the ball to be scooped is oval, the best profile of the curved surface is an oval arc.

The central axis z of the handle 200 intersects the longitudinal central axis y of the scoop body 100 at the point m, and intersects the normal fm at the point m with an angle of $\beta \leq \pi/3$.

Figure 7:
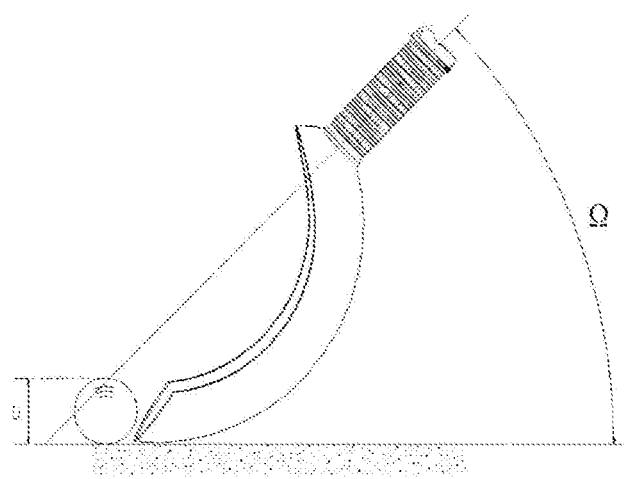
FIG. 7 is a schematic view showing the ball-scooping state of the preferred embodiment, wherein D is the diameter of a preferred adaptive ball.

The handle 200 obliquely intersects the scoop body 100 to make the grasping of the scoop easier. As shown in FIG. 7, in the course of scooping, the angle Ω between the central axis of the handle 200 and the plane on which the ball rolls is about π/4; and such an angle may render the scooping of ball easier.

A longitudinal equalization line k of a smaller half of an oval plane formed of all the rims of the scoop opening 100 intersects the longitudinal central axis y of the scoop body at point n and intersects the normal fn at the point n with an angle of δ, wherein $0 \leq \delta \leq \pi/2$.

The inclined intersection renders the bottom surface of the scoop opening 100 longer so as to easily scoop the toy ball for pets or make the ball roll into the scoop.

The length of an arc mn on the longitudinal central axis y of the scoop body 100 can be regarded as the nominal length of the scoop body, and the arc mn has a radius R and a corresponding central angle $\alpha \geq \pi/2$.

The opening angle of the scoop body 100, $\alpha \geq \pi/2$, ensures that the length of the entire arc-shaped curved surface is long enough to provide sufficient room for the rolling of balls. As the arm of force for throwing increases, the initial velocity of the ball also increases, which is good for throwing the ball farther.

The two sides 121, 122 of the scoop body 100 are symmetrically located at both sides of a central plane ζ delimited by the longitudinal central axis y of the scoop body 100 and the central axis z of the handle 200 that intersect each other.

The distance between the two sides is shown as W2 in the top view, wherein $W2 \geq D$, and D is the diameter of a ball that is best suitable for scooping. The perpendicular distance between the sides 121, 122 and the tangent plane at the center of the bottom of the curved surface is shown as H2 in the cross-sectional view of the curved surface, wherein $H2 \geq D/2$, such that the gravity of the ball in the scoop is within the scoop body, and the ball will not easily fall out from the sides.

The base portion of the scoop body is like or approximate to a smaller half of a spherical surface, the center of the spherical surface is the point m where the longitudinal central axis y intersects the central axis z of the handle, the radius of the spherical surface is the radius r of the smaller half of the circular tube or approximately circular tube; the longitudinal equalization line P of the plane formed by the rim of the upper edge of the base portion intersects the central axis z of the handle at an angle of $\xi \leq \pi/2$.

The base portion 180 of the scoop body 100 is like or approximate to a smaller half of a spherical surface, the center of the spherical surface is the point m where the longitudinal central axis y intersects the central axis z of the handle 200, and the radius of the spherical surface is the radius r of the smaller half of the circular tube or approximately circular tube.

The spherical surface of the base portion 180 facilities the machining of the scoop, saves materials, and renders the connection between the scoop body 100 and the handle 200 easier.

The plane formed by the rim of the upper edge 182 of the base portion 180 intersects the central axis z of the handle 200 at an angle of ξ, which makes the scoop suitable for scooping a ball. Especially when the ball with an initial movement velocity rolls into the scoop, the ball does not fall out of the scoop from the base portion thereof due to the presence of the base portion 180, and the spherical surface of the base portion 180 can hold the ball to some extent, so the ball can still stay in the scoop, instead of falling out of the scoop from the base portion thereof even if the scoop is inclined upwards with an angle. Thus, the scoop is rendered suitable for scooping a ball. Especially when the ball with an initial movement velocity rolls into the scoop, the ball does not fall out of the scoop from the base portion thereof due to the presence of the base portion 180.

There are two or more ridges 160 on the inner surface of the scoop body 100; the ridges 160 are in the shape of triangle or semi-circle in the cross-section of the smaller half of the circular tube; when there are only two ridges, they 161, 162 are symmetrically located at both sides of a central plane delimited by the longitudinal central axis y of the scoop body 100 and the central axis z of the handle 200 that intersect each other; and the central angle formed by the two ridges 161, 162 in the cross-section of the scoop body 100 is $\eta \leq \theta$. A chord formed by the two ridges 161, 162 in the cross-section of the scoop body 100 is denoted by q, and the chord q is a plane or partially a plane with respect to the bottom of the scoop body 100.

The distance between the two ridges 161, 162 is shown as W1 in the top view, wherein $W1 \leq D$, and D is the diameter of a target ball to be scooped. The perpendicular distance between the ridges 161, 162 and the center of the bottom of the scoop body is shown as H1 in the cross-sectional view of the curved surface, wherein $H1 \leq D/2$. The ridges 160 serve as supporting tracks for the ball during its movement in the scoop, and make it easier for the ball to smoothly roll along the curved surface of the scoop opening, instead of slipping or rotating within the scoop.

The handle 200 and the scoop body 100 are integrally formed, and certainly may be made separately.

The handle 200 is in a shape of a hollow cylinder or in other shape, and is provided therein with a cavity to accommodate liquid or solid pet drinks/foods, such as pet biscuits or pet drinks.

The handle 200 may be solid and in other shape suitable for hand gripping.

The handle 200 comprises inner supporting ribs 260, bulging rings 210, an upper hook-like boss 271, a lower hook-like boss 272 and a slot 290; there are two or more inner supporting ribs 260; the plurality of inner supporting ribs 260 is symmetrically arranged with respect to the central axis z of the handle 200 and equidistantly distributed on the inner wall of the handle 200 close to the scoop body 100; there is a plurality of bulging rings 210 that is equidistantly distributed on the outer wall of the handle 200; and the upper hook-like boss 271 and the lower hook-like boss 272 in the front view are horizontally symmetrically arranged, with respect to the central axis z of the handle 200, on the outer wall of the handle 200 between the bulging rings 210 and the slot 290.

The inner supporting ribs 260 function to strengthen the cylindrical handle 200 and meanwhile separate the inner space of the cylindrical handle 200 into two parts, wherein one part has the inner supporting ribs 260, and the other part without inner supporting ribs 260 forms a space for accommodating other objects. The length of the inner supporting ribs 260 can be adjusted according to the desired size of the space for accommodating other objects; or the inner supporting ribs 260 can be used to limit or retain the position of the objects accommodated therein.

The preferred embodiment further comprises a handle cover 300 that includes a cover ring 380, slots 381 and a tail cover 383; the cover ring 380 is sleeved onto the outer edge of the handle 200; the tail cover 383 and the cover ring 380 are hingedly connected; the slots 381 are symmetrically arranged on the inner wall of the handle cover 300, two of the slots 381 rotatably cooperate with the upper hook-like boss 271 and the lower hook-like boss 272 of the handle 200 to secure the handle cover 300 to the handle 200; the handle cover 300 rotates in a counter-clockwise direction so as to thread hooks of the upper hook-like boss 271 and the lower hook-like boss 272 of the handle 200 into the hook-like slots 381 of the handle cover 300, and the handle cover 300 is fixed to the handle 200; and the handle cover 300 rotates in a clockwise direction so as to thread hooks of the upper hook-like boss 271 and the lower hook-like boss 272 of the handle 200 out of the hook-like slots 381 of the handle cover 300, and the handle cover is disengaged from the handle 200.

The cavity within the handle 200 of the preferred embodiment can accommodate a cylindrical biscuit box 90 and a slot 290 for holding the biscuit box 90 in position, wherein the slot 290 includes a first slot 291 and a second slot 292 that are not axis-symmetrically positioned in the tail of the handle 200.

On the outer surface of the biscuit box 90 is there a protruding ring 99 fitting well with the handle 200, and the protruding ring 99 has two lugs 991, 992 that are not axis-symmetrical; when the biscuit box 90 is axially placed into the handle 200, the lugs 991, 992 are embedded onto the first slot 291 and the second slot 292 correspondingly to fix the biscuit box 90 within the handle 200.

Figure 8:
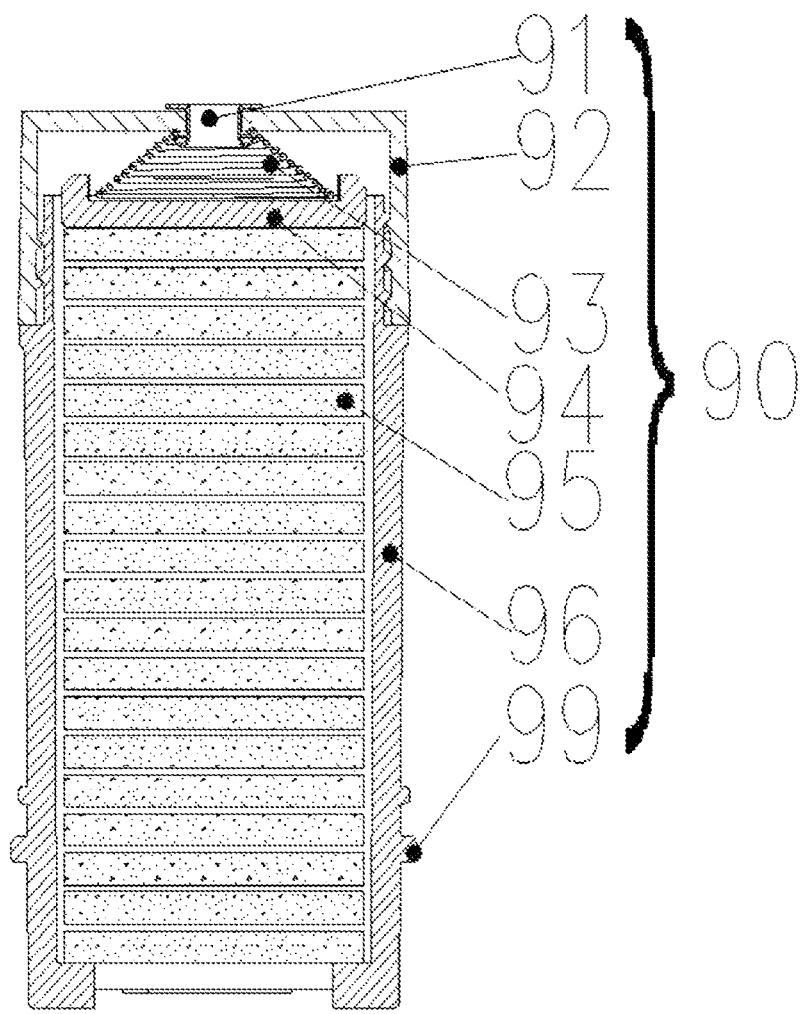
FIG. 8 is a front cross-sectional view under orthographic projection of a biscuit box 90.
Figure 9:
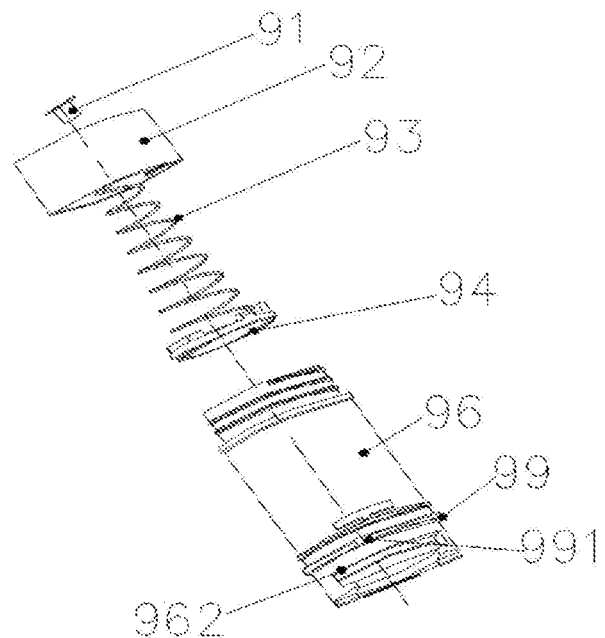
FIG. 9 is an exploded schematic view under axonometric projection of the biscuit box 90.
Figure 10:
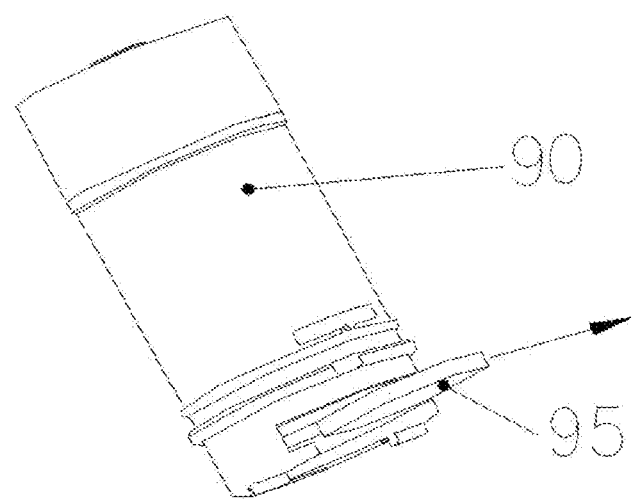
FIG. 10 schematically shows how a biscuit 95 is taken out of the biscuit box 90, wherein the arrow indicates the direction where the biscuit is taken out.

With reference to FIGS. 8 and 9, the biscuit box 90 comprises a fixing pin 91, a box cover 92, a spring 93, a top plate 94 and a box body 96; the spring 93 is fixed onto the box cover 92 by the fixing pin 91, the top plate 94 is connected with the front end of the spring 93 so as to be telescopically placed into the box body 96, the box cover 92 is fixedly connected with the box body 96 through threads; and an outlet 962 for biscuits 95 is arranged at a side of the front section of the box body 96.

The box cover 92 is rotated to be opened, the biscuits 95 are put into the biscuit box 90, and then the box cover 92 is rotated to be closed. At this time, the spring 93 pushes the biscuit 95 forwards to the top of the box body 96, so that the biscuit 95 can be pressed out by hand from the biscuit outlet 962 at the side of the box body. Under the action of the spring force, the biscuit can always be pushed to the biscuit outlet 962.

The biscuit box 90 is a universal part for use on multiple occasions; and such a part of common use can save production costs.

There may be one or more slots 290 for holding the biscuit box in position on the cylindrical handle 200, and the shape, size, number and position thereof can be adjusted according to the corresponding protruding structures on the biscuit box 90 as long as the biscuit box 90 can be fixed.

The opening direction of the tail cover 383 of the preferred embodiment is consistent with the direction of the outlet 962 for the biscuits 95 when the handle cover 300 and the biscuit box 90 are fixed to the handle 200, so that the biscuit 95 can still be taken out from the biscuit outlet 962 of the biscuit box 90 without the tail cover 383 being disengaged from the handle 200.

In the present preferred embodiment, the opening direction of the biscuit box 90 needs to be consistent with the opening direction of the tail cover 383 when opened, so the biscuit box 90 must be fixed to the cylindrical handle 200; and it shall be ensured that the biscuit opening 962 of the biscuit box 90 orthogonally intersects the longitudinal cross-section of the cylindrical handle 200, so that the direction of the biscuit opening 962 of the biscuit box 90 is suitable for single-handed operation for most right-handed users.

Under the above circumstances, the handle cover 300 shall be fixed through mating of the slot 381 on the handle cover with the upper and lower hook-like bosses 271, 272 on the cylindrical handle 200, so as to ensure that the opening direction of the tail cover 383 of the handle cover 300 is consistent with the direction of the biscuit opening 962 of the biscuit box 90 fixed to the cylindrical handle 200, without influencing the removal of biscuits by the opening direction of the tail cover 383.

Where there is no requirement for the opening direction of the biscuit box 90 or other part built in the cylindrical handle 200, the handle cover 300 and the cylindrical handle 200 can be mated and fixed together in any other form, and the opening direction of the tail cover 383 can be in any direction.

The above embodiments are only preferred embodiments of the present invention, and specific and detailed depiction thereof cannot be understood as any limitation to the scope of the present invention. It shall be noted that those ordinarily skilled in the art can, without departing from the concept of the present invention, make various variations and improvements that fall within the scope of the present invention. Thus, equivalent replacements and modifications made to the claims of the present invention shall be deemed as falling within the scope of the claims of the present invention.

What is to be claimed is:

1. A ball-throwing scoop for interaction with a pet, comprising a scoop body and a handle, the scoop body including a scoop opening for receiving a ball, two sides and a base portion, wherein the scoop body is configured as a circular tube longitudinally cut off, and has a longitudinal central axis y, the longitudinal central axis y being an arc having a radius R; cross-section of the circular tube having a radius r and a central angle θ to which the arc in the cross-section corresponds, wherein R>>r, and $2\pi/3 \leq \theta \leq \pi$; wherein the base portion of the scoop body is connected to the handle, a central axis z of the handle intersects the longitudinal central axis y of the scoop body at a point m, and intersects a normal fm of the longitudinal central axis y at the point m with an angle of $\beta \geq 0$;

wherein the central axis z of the handle intersects the longitudinal central axis y of the scoop body at the point m, and intersects the normal $f_m$ at the point m with an angle of $\beta \leq \pi/3$;

wherein the length of an arc mn on the longitudinal central axis y of the scoop body is the nominal length of the scoop body, and the arc mn has the radius R and a corresponding central angle $\alpha \geq \pi/2$;

wherein the handle and the scoop body are integrally formed in process, and the handle is in a shape of a hollow cylinder with a cavity therein to store liquid or solid pet drinks/foods;

wherein the cavity within the hollow cylindrical handle can accommodate a cylindrical biscuit box and is provided with a slot structure for holding the biscuit box in position, the slot structure including a first slot and a second slot that are not axis-symmetrically positioned in a tail of the handle; and wherein a protruding ring is provided on an outer surface of the biscuit box wherein the protruding ring engages with the handle, the protruding ring having two lugs that are not axis-symmetrical; when the biscuit box is axially placed into the handle, the lugs are embedded onto the first slot and the second slot correspondingly to fix the biscuit box within the handle.

2. The ball-throwing scoop for interaction with a pet according to claim 1, wherein a longitudinal equalization line k of a part of an oval plane formed of all rims of the scoop opening intersects the longitudinal central axis y of the scoop body at point n and intersects the normal $f_n$ at the point n with an angle of $0 \leq \delta \leq \pi/2$.

3. The ball-throwing scoop for interaction with a pet according to claim 1, wherein the two sides of the scoop body are symmetrically located at both sides of a central plane delimited by the longitudinal central axis y of the scoop body and the central axis z of the handle that intersect each other.

4. The ball-throwing scoop for interaction with a pet according to claim 1, wherein the base portion of the scoop body resembles a part of a spherical surface, a center of the spherical surface is the point m where the longitudinal central axis y intersects the central axis z of the handle, the radius of the spherical surface is the radius r of the part of the circular tube or approximately circular tube; the longitudinal equalization line P of the plane formed by a rim of an upper edge of the base portion intersects the central axis z of the handle at an angle of $\xi \leq \pi/2$.

5. The ball-throwing scoop for interaction with a pet according to claim 1, wherein there are two or more ridges on an inner surface of the scoop body; the ridges are in the shape of triangle, rectangle or semi-circle in the cross-section of the part of the circular tube.

6. The ball-throwing scoop for interaction with a pet according to claim 5, wherein a chord formed by the two ridges in the cross-section of the scoop body is denoted by q, and the chord q is a plane or partially a plane with respect to the bottom of the scoop body.

7. The ball-throwing scoop for interaction with a pet according to claim 5, wherein when there are only two ridges, they are symmetrically located at both sides of a central plane delimited by the longitudinal central axis y of the scoop body and the central axis z of the handle that intersect each other; and the central angle formed by the two ridges in the cross-section of the scoop body is $\eta \leq \theta$.

8. The ball-throwing scoop for interaction with a pet according to claim 1, wherein the biscuit box comprises a fixing pin, a box cover, a spring, a top plate and a box body; the spring is fixed onto the box cover by the fixing pin, the top plate is connected with a front end of the spring so as to be telescopically placed into the box body, the box cover is fixedly connected with the box body through threads; and an outlet for biscuits is arranged at a side of a front section of the box body.

9. The ball-throwing scoop for interaction with a pet according to claim 8, further comprising a handle cover that includes a cover ring and a tail cover; the cover ring being sleeved onto the tail of the handle; the tail cover and the cover ring being hingedly connected; and the opening direction of the tail cover being consistent with the direction of the outlet for the biscuits when the handle cover and the biscuit box are fixed to the handle.

10. The ball-throwing scoop for interaction with a pet according to claim 1, wherein the handle comprises two or more inner supporting ribs, bulging rings and upper and lower bosses; a plurality of the inner supporting ribs is symmetrically arranged with respect to the central axis z of the handle and equidistantly distributed on an inner wall of the handle close to the scoop body; there is a plurality of bulging rings that is equidistantly distributed on an outer wall of the handle; and the upper and lower bosses are horizontally symmetrically arranged, with respect to the central axis z of the handle, on the outer wall of the handle between the bulging rings and a slot structure.

11. The ball-throwing scoop for interaction with a pet according to claim 10, further comprising a handle cover that includes a cover ring, slots and a tail cover; the cover ring being sleeved onto a tail of the handle; the tail cover and the cover ring being hingedly connected; the slots being symmetrically arranged on the inner wall of the handle cover, two of the slots rotatably cooperating with the upper and lower bosses of the handle to secure the handle cover to the handle; the handle cover rotating in a counter-clockwise direction so as to thread hooks of the upper and lower hook-like bosses of the handle into the hook-like slots of the handle cover, the handle cover being fixed to the handle; and the handle cover rotating in a counter-clockwise direction so as to thread hooks of the upper and lower hook-like bosses of the handle out of the hook-like slots of the handle cover, the handle cover being disengaged from the handle.

* * * * *